United States Patent [19]
Mayer et al.

[11] Patent Number: 5,202,068
[45] Date of Patent: Apr. 13, 1993

[54] METHOD AND APPARATUS FOR CONTROLLING BLOWN FILM THICKNESS

[75] Inventors: Daniel W. Mayer, Arden Hills, Minn.; Roger C. Oestreich, River Falls, Wis.; Richard Rosik, Minneapolis, Minn.

[73] Assignee: Modern Controls, Inc., Minneapolis, Minn.

[21] Appl. No.: 765,453

[22] Filed: Sep. 25, 1991

Related U.S. Application Data

[63] Continuation of Ser. No. 602,621, Oct. 24, 1990, abandoned.

[51] Int. Cl.$^5$ .................... B29C 49/78; B29C 55/28
[52] U.S. Cl. ............................. 264/40.1; 264/40.7; 264/209.2; 264/211.12; 264/564; 425/141; 425/162; 425/326.1; 425/377
[58] Field of Search ........... 264/40.1, 40.7, 209.2, 264/211.12, 564; 425/72.1, 135, 141, 162, 326.1, 377

[56] References Cited

U.S. PATENT DOCUMENTS

| | | | |
|---|---|---|---|
| 3,286,302 | 11/1966 | Doering | 425/141 |
| 4,246,212 | 1/1981 | Upmeier et al. | 264/40.1 |
| 4,339,403 | 7/1982 | Upmeier et al. | 264/40.1 |

Primary Examiner—Leo B. Tentoni
Attorney, Agent, or Firm—Palmatier, Sjoquist & Helget

[57] ABSTRACT

A process and apparatus for controlling the thickness of film made in a blown film machine having a rotating die, wherein a variable speed motor is used to control the haul-off speed of the film from the machine, by subdividing the die rotation into angular segments, measuring the blown film thickness at a point fixed in space and across each of the angular segments, and calculating an average film thickness for an angular segment, and comparing the measured thickness against a preselected desired thickness, and increasing or decreasing the speed of the variable speed motor to change the haul-off speed to bring the measured thickness into agreement with the preselected thickness.

7 Claims, 5 Drawing Sheets

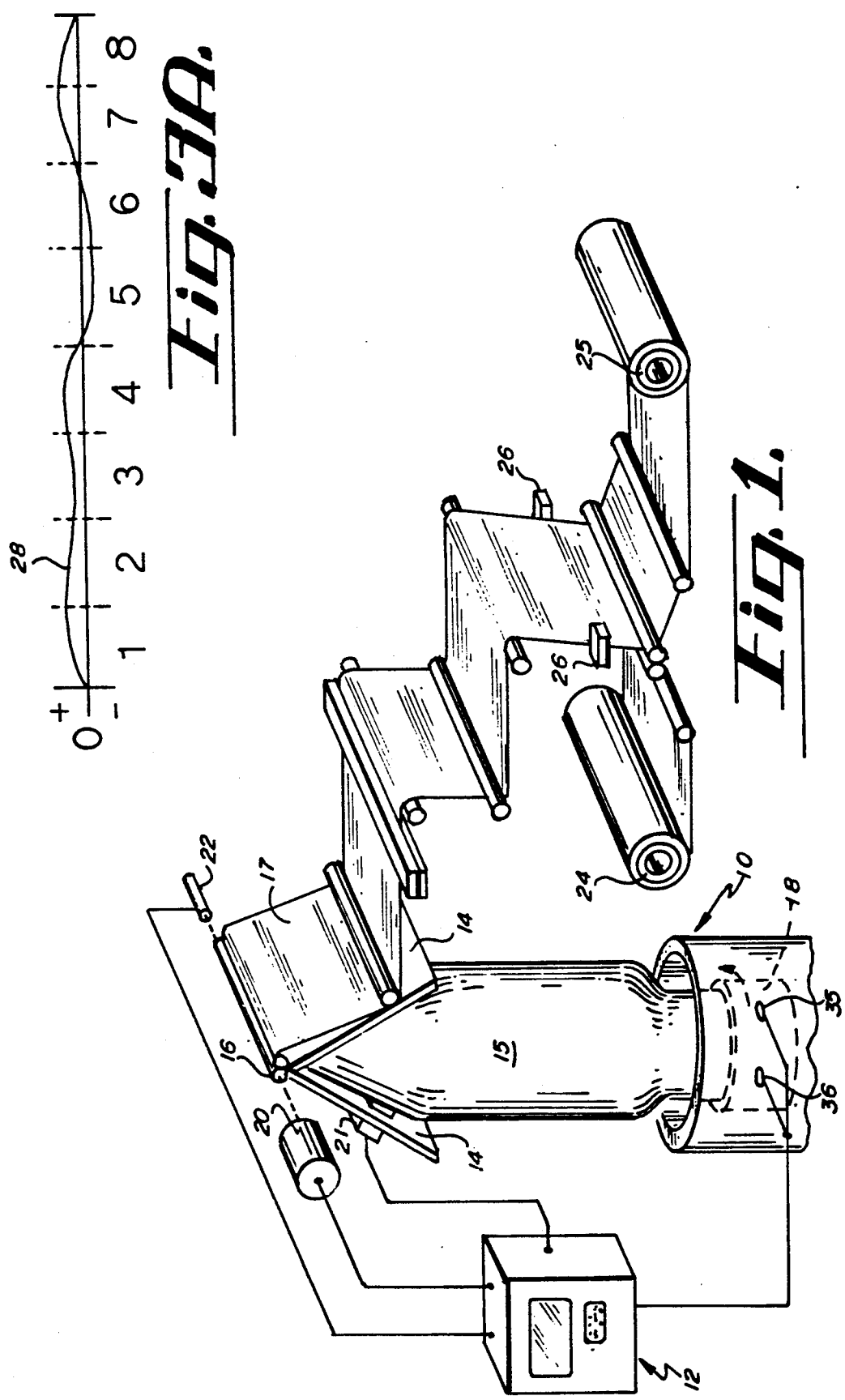

DIE ROTATION

METHOD AND APPARATUS FOR CONTROLLING BLOWN FILM THICKNESS

This is a continuation of application Ser. No. 07/602,621, filed on Oct. 24, 1990, now abandoned.

BACKGROUND OF THE INVENTION

This invention relates to a process for controlling blown film thickness and the apparatus for performing the process; more particularly, the process and apparatus relate to a blown film thickness control for improved response time and accuracy, for significantly reducing scrap material.

Machines for producing plastic film by the blown film process operate generally on the principle of producing a plastic bubble by means of air interaction with molten plastic through a narrow annular gap. The gap is formed in a die, or more correctly, by the concentric positioning of two dies so as to provide an intermediate annular gap therebetween. The plastic bubble which is created by the machine is usually collapsed in a region above the die, by pulling the plastic film through a collapsing frame which has an "A" shape, wherein a gap at the top of the frame permits the film to be passed through the frame and over a series of rollers. At least one set of these rollers is referred to as a "nip" roller, and is driven by a motor which has a controllable rotational speed. The thickness of the plastic film may be controlled by varying the rotational speed of the motor, thereby varying the rotational speed of the haul-off rollers, and the linear movement of the plastic bubble. The film which is produced by this machine is then passed over a series of further rollers and edge cutters, and is ultimately collected on take-up reels for storage and disposition.

A continuing problem with machines of the type hereinbefore described is the problem of maintaining a film thickness within relatively narrow tolerances. Plastic films manufactured by these machines are typically made in film thicknesses ranging from 0.001 to 0.010 inch (1-10 mils), and it is desirable to control the thickness to ±3% or better. Film thickness is typically controlled by sensors which monitor the film as it is formed into the plastic bubble, and circuits which convert the sensor signals to motor drive signals to vary the speed of the haul-off rollers. The haul-off rollers may be increased in speed in order to produce a thinner film thickness, and decreased in speed in order to produce a thicker film thickness.

A further problem in this process is the problem of localized imperfections or variations in the die, which produces localized regions of thicker or thinner film. Any die which utilizes an annular gap for producing film will invariably have variations in gap dimension; a gap variation of only a few percent over a localized region is unacceptable, particularly when one considers that the film produced by the machine is collected on rollers, and a localized unevenness in the film will create a cumulative thickness as the take-up roll is filled, leading to a lumpy and unstable roll of the finished product. This problem has been at least partially solved by rotating the die as the machine is operated, to essentially distribute imperfections about the circumference of the bubble, so that a buildup of thicker or thinner film material will not distort the take-up roll. In a typical machine, the die is rotated at a very slow rate, usually at about 3-10 minutes per revolution. The blown film bubble moves at a linear speed in the range of 50-300 feet per minute, and therefore an imperfection in film thickness caused by the die gap will be distributed more or less evenly across the plastic film sheet which is ultimately placed on a take-up roll.

In compensating for film thickness variations, a thickness sensor placed against the outer surface of the bubble can provide an instantaneous measurement of thickness at its localized position. By virtue of the rotation of the die, a thickness sensor will eventually measure the film thickness of the entire bubble, because the film produced by each angular sector of the die will eventually move past the sensor. However, since the die is rotating at a relatively slow angular rate, a film thickness measurement of the entire circumference will require some 3-10 minutes of operation, during which time 100-3,000 feet of film may have been manufactured. If the overall average film thickness is measured to be outside of permissible limits, the rotational speed of the haul-off rollers can be controlled, but at the cost of producing a considerable amount of film outside of specifications. In the prior art, this problem has been addressed by mounting the sensor for measuring thickness on a circular trolley, and transporting the sensor about the bubble at the same time as the bubble is being formed. The rate of rotation of the sensor about the bubble is typically controlled at 1-3 minutes per revolution, thereby permitting a complete measurement of thickness of the entire bubble to be made within a much shorter period of time. While this does reduce the response time required by the system for correcting film thickness errors, it requires the additional expense of constructing the circular trolley system for the sensor. Further, since the relative movement of both the sensor and the plastic film bubble occurs while the sensor measurements are being made, measurement errors may be caused by the failure of the sensor to maintain close contact with the film bubble.

The present invention provides an improved apparatus and process for controlling the thickness of blown film, without the necessity for providing a rotating carriage for the film thickness sensor. Furthermore, the present invention provides a method for compensating for die gap variations, so that variations in the film thickness profile around the circumference of the bubble may be taken into consideration in generating the control signal for varying the speed of rotation of the nip rollers.

SUMMARY OF THE INVENTION

A process and apparatus is disclosed whereby the plastic film bubble is organized into angular segments, the segments rotating at the die rotational speed, and the angular segments are monitored by a film thickness sensor which is in a fixed position. A film thickness profile is established which is characteristic of the gap variations of the die in all of the angular segments, and the monitored film thickness for each segment is compared against the profile for that segment, to generate control signals for varying the linear speed of the plastic film bubble. The response time for generating a correction signal to increase or decrease the linear film speed is reduced to the time required to monitor a particular angular segment, and does not require the monitoring of the entire circumference of the film bubble.

It is therefore a principal object of the present invention to provide a process for controlling blown film thickness to a greater precision than has heretofore been possible, and an apparatus for performing the process.

It is another object of the present invention to provide a process and apparatus for controlling blown film thickness to reduce waste, by virtue of the improved response time in correcting thickness errors.

DESCRIPTION OF THE DRAWINGS

The invention will become understood from the following specification and claims, and with reference to the drawings, in which:

FIG. 1 shows a pictorial view of the system for practicing the present invention;

FIG. 3A shows a representative die gap profile;

DESCRIPTION OF THE PREFERRED EMBODIMENT

Figure 5:
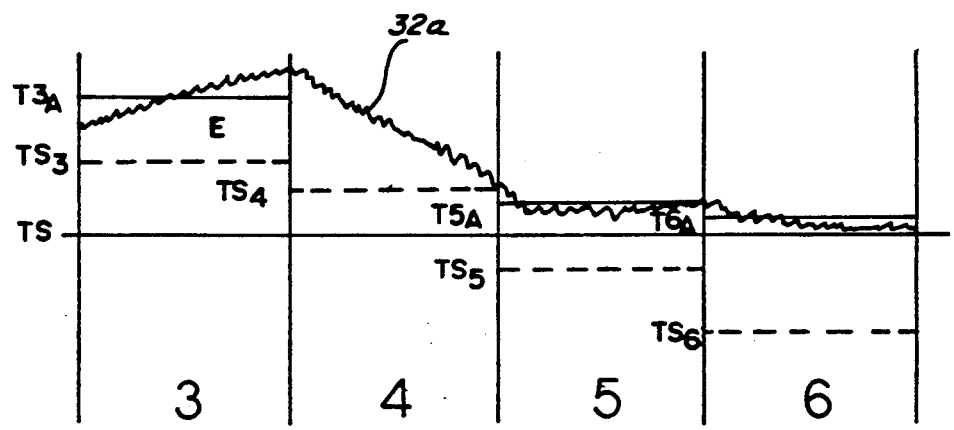
FIG. 5 shows a diagram illustrating the present invention.

Referring first to FIG. 1, there is shown a representative blown film system 10. A rotating die 18, in combination with an air supply source (not shown) produces a plastic film bubble 15. Bubble 15 is collapsed at its top end by a collapsing frame 14 and the collapsed film passes over a haul-off roller 16. Nip roller 16 is powered by a drive motor 20 which rotates at a speed determined by computer processor 12. The rate of rotation is monitored by a shaft encoder 22, which develops signals that are passed back to computer processor 12. The plastic film thereafter is fed as a double-walled film sheet 17 over a series of rollers, until it passes by a pair of cutters 26 which separate the film into two sheets. The two film sheets are collected on take-up rollers 24, 25 which may be removed from the system for shipment after the system has produced a desired yield of plastic film. The thickness of the film may be monitored by a thickness sensor 21, which produces signals that are connected to computer processor 12. Computer processor 12 is also coupled via sensors 35 and 36 to the rotatable die, to monitor the rotation and position of the die.

The same effect may be achieved with a non-rotating die system, wherein the film winder mechanism rotates. In this case sensor 21 is located in or near the winder mechanism so that the entire bubble circumference passes the sensor.

Figure 2:
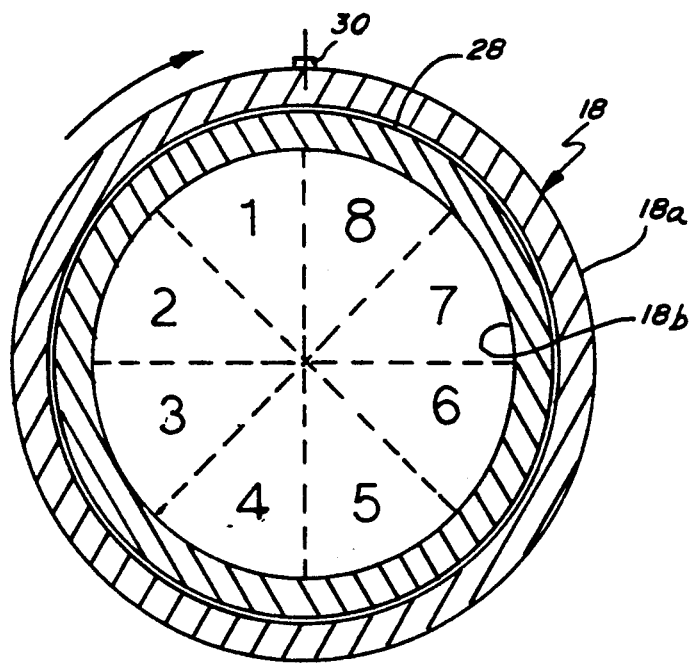
FIG. 2 shows a diagrammatic view of the die with segments identified.

FIG. 2 shows a pictorial view of die 18, which may be formed of an outer die-casting 18a and an inner die-casting 18b, spaced apart by a die gap 28. Die gap 28 is selected to produce the desired film thickness, and plastic bubble 15 originates at die gap 28. In a typical system the casting 18 is rotatable at a relatively slow rate; typically 3–10 minutes per revolution. An index marker 30 is placed on the die 18 in order to provide an indication of the start of each revolution; sensor 35 is utilized to generate a signal to computer processor 12 upon the passage of index marker 30. According to the teachings of the present invention, die 18 may be subdivided into a plurality of angular segments which will be described more fully hereinafter. For purposes of illustration, FIG. 2 shows eight angular segments, but in practical operation any greater or lesser number of angular segments may be chosen. As the die 18 rotates in operation, each of the angular segments will pass a point fixed in space, and therefore the film produced by the die gap corresponding to each segment will also pass the point fixed in space. Thickness sensor 21 is mounted at such a fixed point, and therefore is capable of measuring the thickness of the plastic film bubble corresponding to each of the angular segments which have been selected. Die gap 28 width is closely related to the plastic film thickness, which is typically in the range of 0.5 to 10 mils, and therefore sensor 21 is capable of measuring plastic films over this range of thickness.

Because of imperfections in the manufacture and positioning of the die castings 18a and 18b, die gap 28 may be non-uniform in width about its entire circumference. In the calibration process, it is necessary to establish a profile of the relative die gap 28 width variations, in order to take these variations into account in calculations relating to film thickness. FIG. 3A shows a representative graph to illustrate the possible variations in die gap 28 width about the consecutive sectors 1–8. For example, if die gap 28 is set to a nominal gap size, represented by "0" on the graph, the manufacturing and positioning tolerances will invariably produce an incrementally larger die gap in certain segments, and an incrementally smaller die gap in certain other segments, and these may be plotted as shown by the graph of FIG. 3A. The percentage variation of these die gap differences is typically on the order of ±3%, so that a nominal die gap setting may actually vary by ±3% about the circumference of the die gap, as represented by angular segments 1–8. Once this die gap profile has been measured it is prestored in computer processor 12 so that it may be taken into consideration in any subsequent film thickness calculations.

Figure 3B:
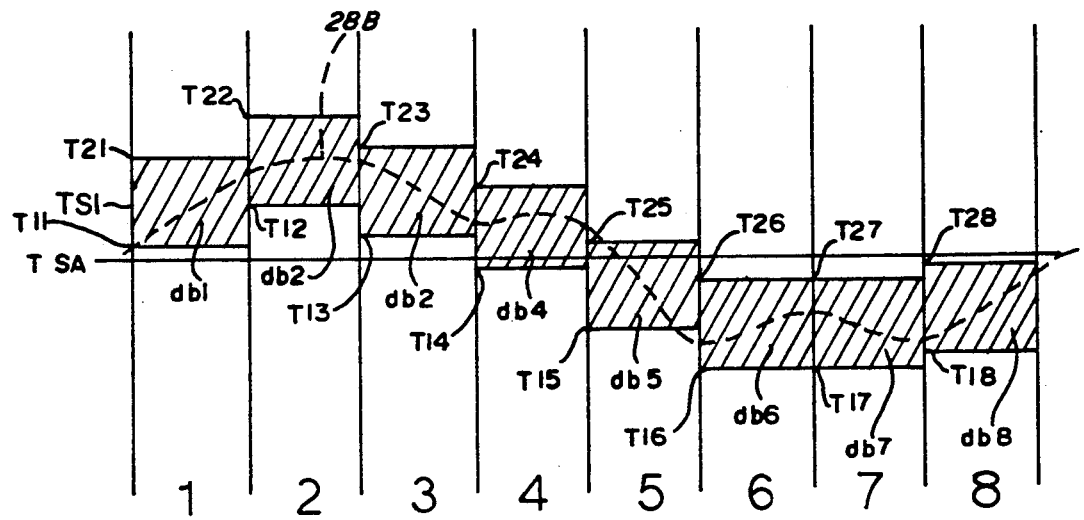
FIG. 3B shows a die gap profile and dead band for the angular segments.

In operation, the die gap profile as illustrated in FIG. 3A is determined empirically by operating the system to produce a nominal length of plastic film, while utilizing the film thickness sensor 21 to measure the actual film thickness over all of the segments constituting a complete film circumference. The measured film thickness variations over each angular segment are collected and averaged by computer processor 12, and a die gap profile is established from these calculations. FIG. 3B illustrates the technique used to develop this profile. Referring to FIG. 3B, if dotted line 28B represents the actual, continuously varying, die gap over all of the angular segments, processor 12 calculates an average die gap for each angular segment. For example, the average die gap for angular segment 1 is $TS_1$, which is established by merely averaging the value of the die gap 28B across segment 1. In addition thereto, the processor calculates a "dead band," which represents a band of measurement about the average value which is determined by the systems resolution and noise sensitivity. For example, angular segment 1 in FIG. 3B has a dead band ranging from a low value of $T_{11}$ to a high value of $T_{21}$, centered about the die gap average $T_{s1}$; this dead band is identified as $db_1$. Each subsequent angular segment 2, 3, . . . 8, has a corresponding dead band $db_2$, $db_3$, . . . $db_8$. The dead band end points in each angular segment are separated by the same distance, but the dead band position itself varies with the average die gap for each segment. In a typical system, a dead band associated with the die gap profile is ±⅛%; the die gap dead band range may be preselected and prestored into computer processor 12. Measurement variations within the dead band are ignored, because it is recognized that the resolution of the system is incapable of recognizing these small changes, and it is desirable to avoid designing a system which "hunts." In a typical system, the dead band for any angular segment is about ±⅛% relative to the average die gap for that segment.

It should be recognized that the die gap profile as illustrated in FIGS. 3A and 3B is a measurement of the physical variation in die gap width about the circumference of the die 18. Therefore, the profile will remain constant regardless of the rate of travel of film through the die gap, and if the haul-off roller speed is increased or decreased the die gap profile will merely move upwardly or downwardly relative to the selected average film thickness value $Ts_1$. Therefore, the die gap profile is usable at all film thicknesses, and remains constant until the die itself is changed.

During operation of the system, it is possible for conditions within the system to change slowly, and thereby to change the die gap profile over a relatively long period of time. For example, a localized temperature change at a point on the die could cause a nominal expansion or contraction of the die in the region of temperature change, and this could change the die gap profile. Likewise, the die gap could become partially plugged over a localized region to restrict the flow of liquid plastic therethrough. For this reason, the die gap profile is preferably periodically recalculated, and the profile may be periodically revised during continuous operation of the system. Since the profile is stored within processor 12 as a series of angular segment averages, it is possible for a processor 12 to readily adjust any of these values to accommodate any detected change in the profile over an extended period of operation. The die gap profile average for any given segment may be continuously updated in processor 12. Processor 12 accumulates the average thickness values calculated for each angular segment during each revolution of the die, and these values may be averaged over any number of die revolutions to derive an overall segment thickness value, which could be termed the "current average value." The "current average value" for all segments can be combined to form a "current die gap profile," and this profile may be compared with any earlier die gap profile to determine whether relative changes have occurred across the die. This technique will allow the die gap profile to be more or less continuously updated during periods of use.

In addition to the gap variations which are illustrated in the profiles of FIG. 3A and 3B, there are a number of other factors which can affect the thickness of the film. The type of plastic material being used, its granular consistency in solid form, the temperature of melting, and the air flow utilized in producing the plastic bubble are some of these factors. The rate of haul-off of the plastic film away from the bubble is another factor affecting film thickness, and it is the haul-off rate which is typically utilized in conjunction with a thickness sensor in order to control thickness. If the thickness sensor detects a gradually increasing film thickness over a period of time, the haul-off rate may be increased to speed up the movement of a plastic bubble and thereby reduce film thickness. Correspondingly, if the plastic film thickness is detected to be decreasing over time, the haul-off rate may be decreased to slow down the plastic bubble and thereby increase the thickness. Changes in film thickness may actually occur over an extended period of operation, caused by a slow buildup of one or more factors contributing to the change. As thickness changes are detected, the haul-off rate may be adjusted correspondingly to bring the average film thickness into an acceptable tolerance range. Among the practices utilized in the prior art to maintain this control, is the practice of monitoring film thickness during an entire revolution of the rotatable die, and to then calculate an average thickness for the die revolution, and to compare this average against the acceptable tolerance range. All of these calculations and comparisons are performed within computer processor 12, as a result of its electrical connections to the die position sensors 35, 36 the thickness sensor 21, and the haul-off roller drive motor 20 and shaft position encoder 22. Since a revolution of die rotation can take from 3-10 minutes to occur, a calculation of average film thickness can occur only at these relatively long intervals. In systems which have utilized a thickness sensor mounted on a circular carriage, an average thickness value can be made for each revolution of the carriage about the film bubble, which typically occurs at 1-3 minute intervals. While this is considerably faster than relying upon die rotation for these calculations, it still may lead to a considerable quantity of film being produced out of tolerance before a correction can be made. The present invention greatly improves upon this response time, in part by utilizing the angular segments hereinbefore described, in combination with further novel steps.

Computer processor 12 may be obtained from any of a number of commercial sources, as a general purpose programmable computer. A computer processor of the type generally known as a "personal computer" may be suitable for this purpose, for when properly programmed it can receive the electrical signals from the various sensors, make the appropriate calculations, and generate a motor drive signal for controlling the motor speed of drive motor 20. All of the electrical circuits required for producing the inputs into processor 12 are readily available in the commercial and industrial marketplace. Likewise, the programming of processor 12 is well within the skill of persons qualified to program such commercially available equipment, based upon the processes described herein.

Figure 4:
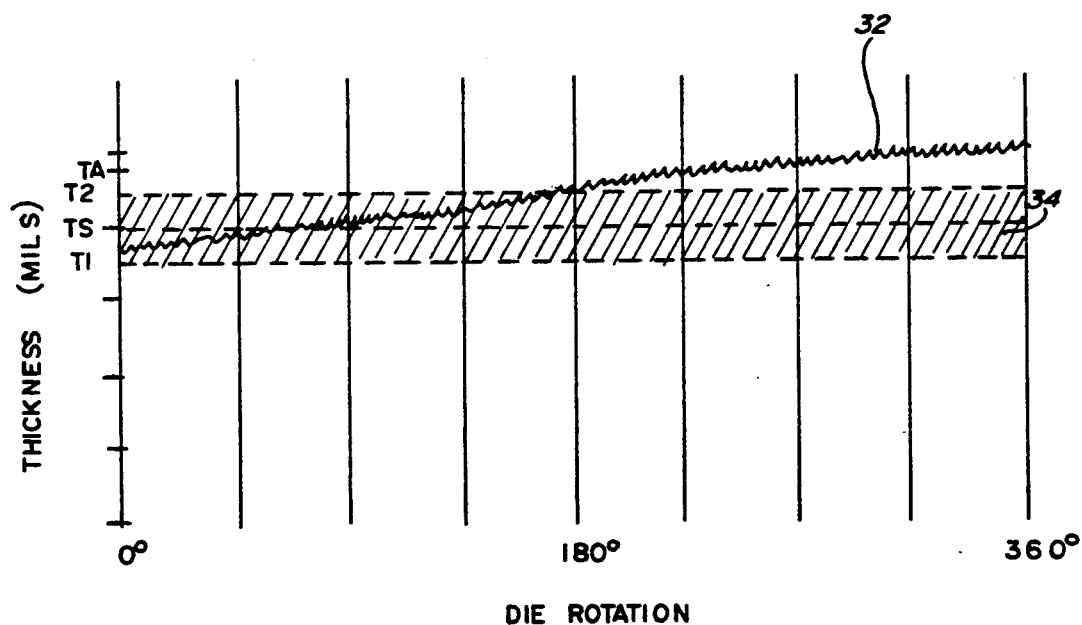
FIG. 4 shows a diagram representing a typical thickness monitoring operation.

FIG. 4 illustrates a representative prior art example, showing a gradual build up of the measured film thickness over a single revolution of die 18. In actual practice, a build up of film thickness may occur over a longer time period, such as several revolutions of die 18, but the representative effect is the same as is illustrated in FIG. 4. The vertical axis of FIG. 4 represents film thickness and the horizontal axis represents angular segments of rotation. Line 32 represents the signal from thickness sensor 21, which includes a measurable amount of noise caused by the sensing circuits. Dotted line $T_s$ represents the film thickness set point; i.e., the film thickness which has been selected by the operator as being the desired film thickness. The shaded area bounded by dotted lines $T_1$ and $T_2$ is a preselected dead band 34, which is a region of signal response which will not generate any corrective action by way of adjusting the speed of the nip rollers. Dead band 34 is selected to be typically ±⅛% of the set point thickness, and is selected to prevent the system from oscillating or hunting about a particular set point. Dead band 34 also accommodates a certain amount of noise on sensor signal 32, so that the system will not react until signal 32 goes outside of dead band 34.

In the prior art, the operator would set a control set point $T_s$ into the system, to indicate the nominal film thickness to be produced by the system. The dead band end points $T_1$ and $T_2$ would either be set into the system or would be a function of system design. As the thickness measurement 32 gradually increases over the die rotational angle it is measured, and after a full rotation of the die an average thickness calculation $T_A$ is determined. In the example of FIG. 4, $T_A$ is calculated to be above the set point $T_s$ (and outside the dead band), and therefore a control signal would be generated to reduce the thickness of the blown film being produced. This control signal may increase the speed of the haul-off rollers to extract film through the die at a more rapid rate, thereby resulting in a reduction in film thickness. At the end of the next subsequent revolution of the die a new calculation would be made and the process repeated. It is apparent from FIG. 4, that the average film thickness $T_A$ represents a smaller value than the actual film thickness at the end of die rotation, and will generate a corrective signal of less than that required. The blown film produced during the entire rotation of the die will contain a considerable length of film having excessive thickness, and thereby will involve considerable waste. The system response according to this prior art approach is exceedingly slow, and generally involves the production of considerable lengths of blown film which are outside of the nominal set point requirements.

FIG. 5 illustrates an example of segment control; i.e., a control which is initiated by the sensor signal 32a exceeding the set point $T_s$ over the angular segment 3. In this case, the average sensor signal $T_{3A}$ over segment 3 exceeds $T_s$, indicating an excessive film thickness. Dotted line $TS_3$ represents the die gap profile for segment 3, and it is apparent that the measured average sensor signal $T_{3A}$ exceeds the thickness which would be predicted for this segment 3 ($Ts_3$) if the system were running at set point $T_s$. Therefore, the difference E represents the error which must be reduced in order to return the system to nominal operation. Processor 12 calculates the motor drive signal required to reduce the error E to zero, and changes the speed of the haul-off rollers in order to accomplish this reduction. The transition occurs over angular segment 4, and no average thickness values are calculated for segment 4 because of this transition. The system stabilizes at segment 5, and a calculation of average film thickness $T_{5A}$ is made for segment 5, as indicated on FIG. 5. It is noted that the average thickness value $T_{5A}$ is above the die gap profile $Ts_5$, which indicates that the average film thickness measurement is still higher than would be expected for segment 5 under nominal drive conditions. However, depending upon the width of the dead band for segment 5, the measured average film thickness value $T_{5A}$ may well be within the dead band. The average measured film thickness value for segment 6 is represented by line $T_{6A}$, which is above the die gap profile $TS_6$ for segment 6. Depending upon the dead band, this difference may dictate a further drive signal to change the speed of the haul-off rollers to further reduce film thickness.

According to the teachings of the present invention, the segment control technique illustrated in FIG. 5 is combined with the die gap profile technique illustrated in FIG. 3B. That is, for each segment of die rotation there is established a die gap profile and consequent dead band range, and this dead band is compared with the average measured film thickness for the same segment, and the results of the comparison are used to determine whether the haul-off rollers should be increased or decreased in speed. In this manner, the physical variations in die gap width can be taken into account over each segment of die rotation, so that the average film thickness measurement over the segment can be more accurately controlled. Further, the invention contemplates monitoring the measured average film thickness per segment over extended periods of time, thereby to detect longer term variations in die gap profile, and to make corrections to the die gap profile, if necessary, resulting from changing conditions during operation. As described earlier, such changes can occur as a result of localized die temperature variations, build up of die gap obstructions, etc.

In operation, sensors 35 and 36 monitor the rotational position of die 18, and also an index indicator which identifies the start of each new rotation of die 18. Sensor 21 continuously monitors film thickness, generating a film thickness signal to processor 12. Processor 12 receives the angular rotation signals from sensors 35 and 36, and the sensor thickness signal from sensor 21, and calculates an average film thickness for each segment of angular rotation. The operator may specify the cross direction film thickness, and the cross direction dead band range. The term "cross direction" refers to the entire circumference of film bubble 15, and actually relates to average values measured about the film bubble 15 circumference. The operator may also specify a dead band range for each segment, which typically is a wider range of value than the average dead band specification. The reason for specifying a wider dead band under segment control specifications is to limit the degree of control exercised; i.e., to limit the number of nip roller drive signal corrections which might occur during each revolution of the die. Therefore, under segment control, a correction signal to change nip roller speed is not generated until error buildup exceeds a predetermined dead band, but then the nip roller correction signal may be a step function change in roller speed. By contrast, the cross direction dead band is somewhat narrower, typically ½ the dead band of the individual segments, which enables the system to correct for smaller deviations from set point, but at much lower rates.

The process measures the instantaneous film thickness across each segment of rotation, and calculates an average value for the segment. This average segment value is compared against the upper and lower segment dead band limits, to determine whether the average segment value lies within the dead band. For so long as the average segment value lies within segment dead bands the process merely continues the comparison over each of the subsequent segments. Each of the segment average values are stored for future reference.

At the end of a complete scan of all segments of rotation, the process calculates an average cross web thickness, and compares this average value with the upper and lower cross web dead band limits to determine whether the average thickness lies within the cross web dead band. The process then repeats the measurements and calculations for the next subsequent scan of rotation of the die.

At periodic intervals, the process compares the segment-to-segment averages with the die profile previously established, either at the beginning of the operation or over some number of previous rotations, to determine whether the die profile may have varied over continued usage. If a profile variation is detected, the initial die profile may be corrected, to establish new dead band ranges for each of the segments.

In the event the average film thickness measurement over any segment falls outside of the dead band range for that segment, a signal is generated to either increase or decrease the speed of the nip rollers, as determined by the comparison. Whenever the haul-off speed of the rollers is adjusted in this manner, the next subsequent angular segment measurement is ignored, because it is recognized that the measurement over the next subsequent angular segment is affected by the nip roller drive speed changes resulting from the previous segment. Likewise, at the end of each scan of all angular segments, the average cross direction thickness is determined and compared against the upper and lower cross direction dead band limits to determine whether the average thickness falls within the cross direction dead band. If the average thickness is outside of the dead band, and no segment control actions were required during the scan, a correction signal is generated to the nip rollers to increase or decrease the speed of the drive motor which drives the rollers, as required by the calculation. Theoretically, the average cross direction thickness error could result in a smaller motor drive correction signal than the angular segment error signal, because the cross direction dead band is typically narrower than the angular segment dead band.

While the foregoing description provides an overall view of the process, certain other parameters may be calculated and used to enhance the efficiency of operation. For example, in most conventional blown film systems the nip roller motor drive system consists of a variable speed motor which is driven by an electrical controller, and a manually operable potentiometer which is utilized for setting speed control. In the present invention, this system can be used to advantage by connecting a stepper motor to the potentiometer, and to position the stepper motor by transmitting digital signals from the processor 12. In the preferred embodiment a stepper motor manufactured by Oriental Motor Corporation of Tokyo, Japan, Model No. PX243M-03BA is used to drive a speed control potentiometer, wherein the stepper motor receives a binary signal from processor 12, and this signal translates into a stepper motor shaft position; the stepper motor is capable of 4000 discrete shaft positions, which represent zero to full-scaled movement of the potentiometer. Each of the discrete stepper motor shaft positions can be empirically correlated to represent a film thickness value. An output scale factor (OSF) may be calculated and used to derive the output changes required to correct for a thickness error of a predetermined magnitude. The OSF reflects the size of output change in the drive signals sent to motor system 20 needed to change film thickness by one whole unit; i.e., 1 mil. This value is calculated by relating the percentage of maximum line speed required to produce a given film thickness, since thickness and line speed are linearly related. Calculation of the OSF is made by measurements taken during actual system operation under stable conditions. The actual film thickness measured during a single die rotation is measured, as is the actual motor 20 drive signal voltage. The maximum available motor 20 drive signal voltage is also measured, and the output scale factor is derived from the following formula:

$$OSF = \frac{K\ V1/V2}{T}$$

OSF: Output Scale Factor
V1: Maximum Motor 20 Drive Voltage
V2: Measured Motor 20 Drive Voltage
T: Measured Thickness In the foregoing example, the value "K" is the decimal number of steps from 0 to full scale (4000) which is possible, utilizing the stepper motor and controller connected between computer processor 12 and the nip roller drive motor. This value represents the resolution of the processor/motor control interface. The output scale factor (OSF) determined by the foregoing formula can then be used to establish the number of steps of motor controller change which may be required to change the line speed from any value to a value which will result in a film thickness corresponding to the set point value. This enables a corrective signal to be transmitted to drive motor 20 from any measured thickness value, to drive the motor directly to a new set point value and thereby to ensure that the next measured thickness value falls within the set point range. The invention therefore enables a thickness correction to be made after any segment of a revolution of the rotating die, and therefore greatly increase the response time of the system to out-of-tolerance measurements. This in turn significantly reduces the amount of film which would otherwise be produced under out-of-tolerance conditions.

Figure 6A:
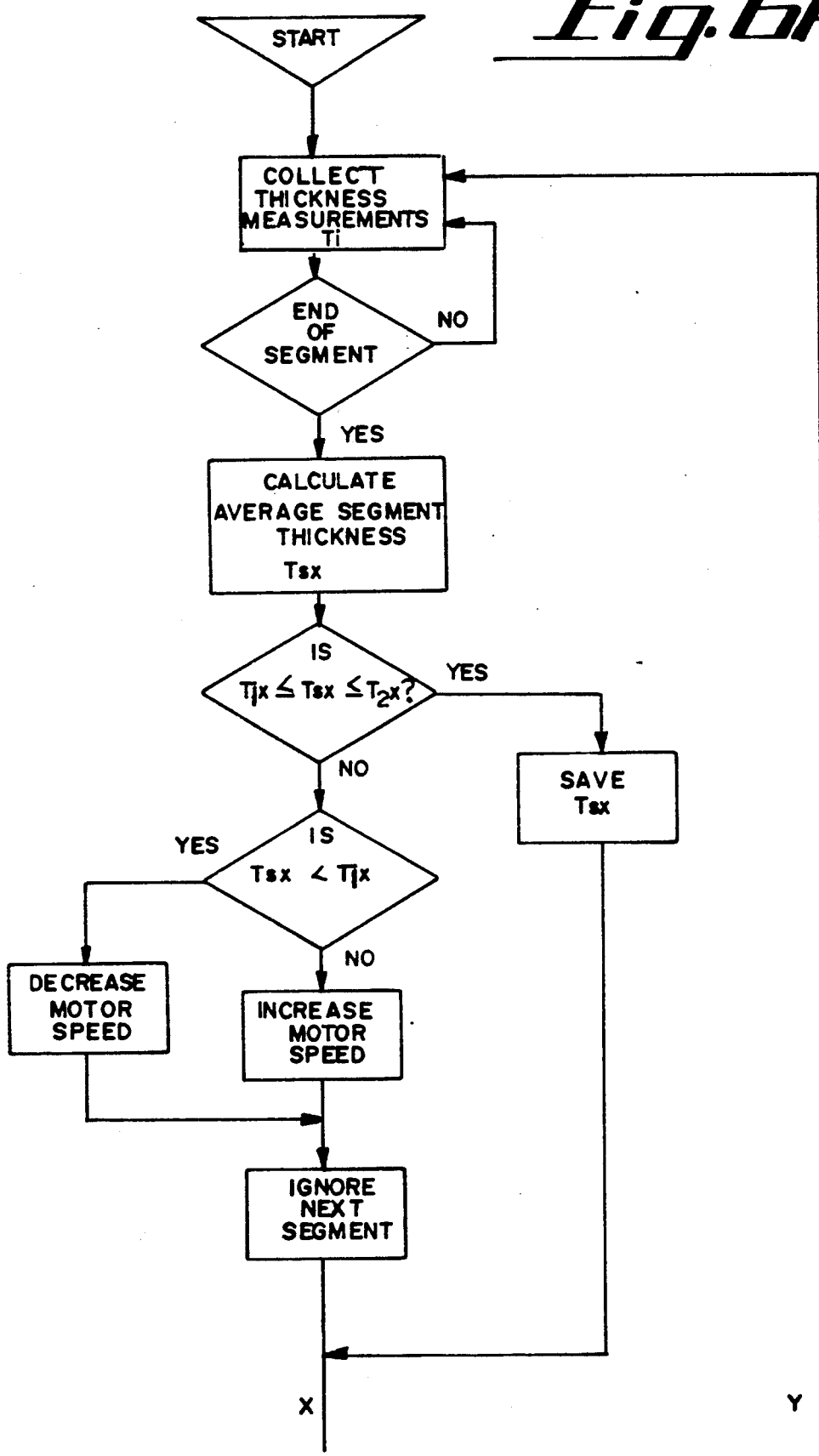
FIGS. 6A and 6B shows a flow chart of the process of the present invention.
Figure 6B:
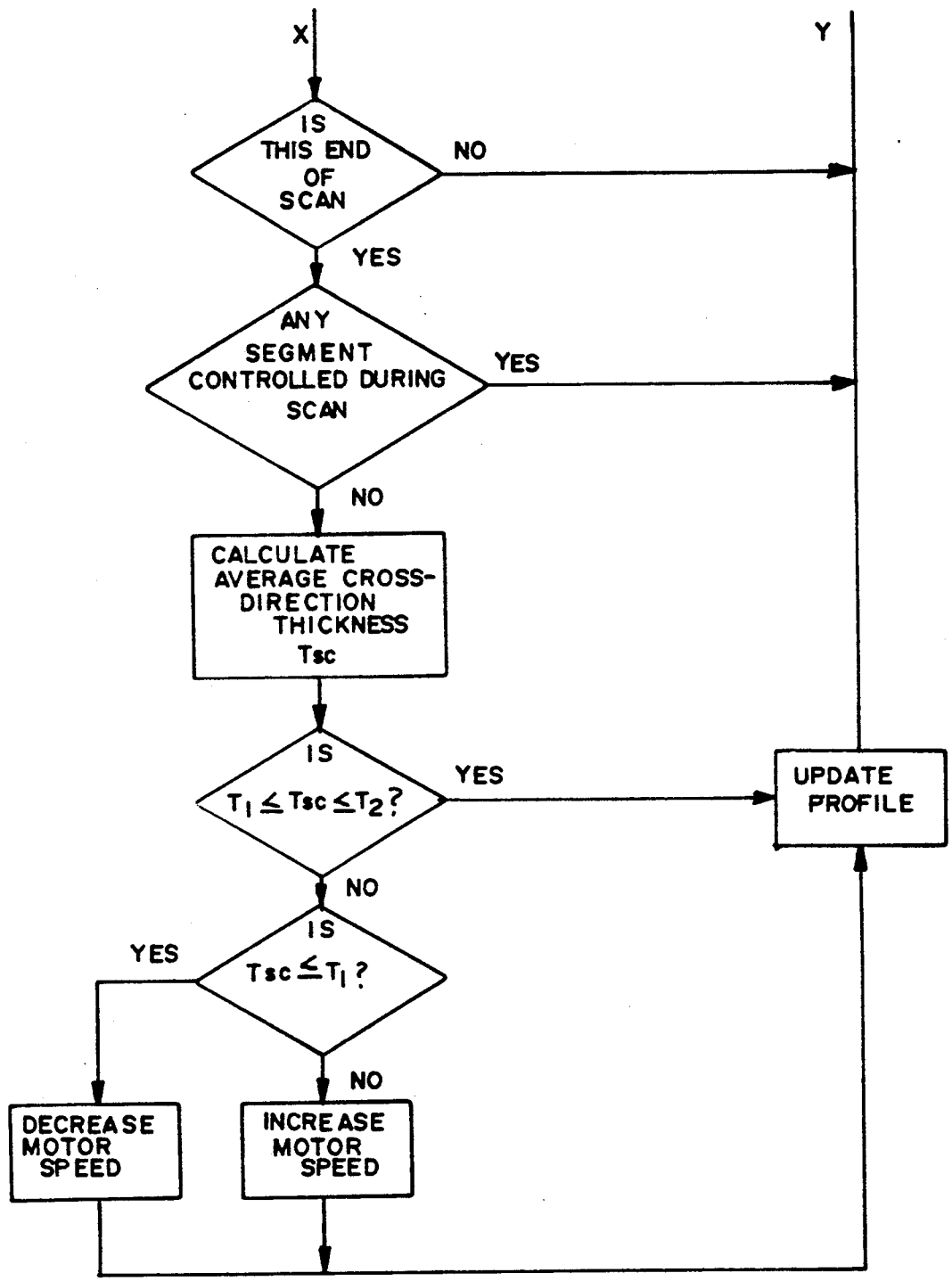

FIGS. 6A and 6B show a flow chart of the process of the present invention. Assuming the process begins with processor 12 monitoring sensor 21 thickness measurements across the first angular segment, the instantaneous thickness measurements across the angular segment are collected, either by a sampling technique or other techniques known in the art. At the end of the angular segment processor 12 calculates the average film thickness $T_{sx}$ across the segment. The average thickness value $T_{sx}$ is then compared with the dead band lower value $T_{1x}$ and the dead band upper value $T_{2x}$ to determine whether the average thickness lies within the acceptable dead band limits. If the average value $T_{sx}$ lies within acceptable limits it is saved and the process continues with measurements for the next angular segment. If the average value $T_{sx}$ is outside of the dead band, the process determines whether the average value $T_{sx}$ is too high or too low, and either increases or decreases the motor speed accordingly. If the speed adjustment is required, the measurements of the next angular segment are ignored, to allow for time for the system to respond to the speed change signals. This mode of operation continues until sensor 35 indicates to processor 12 that the die rotation has been completed for a full revolution, which is represented by an end-of-scan signal.

When an end-of-scan signal is received, the average cross direction film thickness $T_{xc}$ is calculated for the entire scan. This average value $T_{xc}$ is compared against the cross direction dead band values $T_1$ (lower limit) and $T_2$ (upper limit). If the average cross direction thickness $T_{xc}$ lies within these limits the individual segment averages for the previous scan are utilized to update the die gap profile, and the system then returns to the process of monitoring segment measurements. If the average cross direction thickness $T_{xc}$ is outside of the dead band limits, and no segment control actions were required during the scan, the process determines whether the average value is too high or too low, and the motor speed is increased or decreased accordingly. After this adjustment, the system returns to monitoring angular segment thickness measurements.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. An apparatus for controlling thickness of film formed in a blown film machine having a rotatable die for producing a rotatable film bubble, a collapsing frame for collapsing the film bubble, and haul-off rollers for transporting the film away from the collapsing frame, comprising:
    a) means for sensing the rotational position of said die and means for identifying an index point on said die, whereby the rotational position of said die is sensed relative to said index point;
    b) means for subdividing the die and film bubble rotational position into a plurality of N angular segments relative to said index point, whereby said angular segments rotate coincidentally with said die;
    c) a film thickness sensor fixedly mounted to said collapsing frame;
    d) means for receiving signals from said film thickness sensor over all of said angular segments and developing a profile comprising a collection of each of the angular segment average film thickness values;
    e) means for developing a set point film thickness value $TS_1$, $TS_2$, ... $TS_N$ for said N angular segments corresponding to said profile of angular segment average film thickness values, and means for storing said set point film thickness values;
    f) means for receiving signals from said film thickness sensor over any of said plurality of angular segments, and forming an average film thickness value therefrom;
    g) means for comparing said average film thickness value formed for any angular segment against the stored set point film thickness value for the same angular segment and developing a drive signal from said comparison;
    h) a variable speed drive motor connected to said haul-off rollers;
    i) means for sensing the rotational speed of said haul-off rollers; and
    j) means for applying said drive signal to said variable speed drive motor.

2. The apparatus of claim 1, wherein said means for developing a drive signal further comprises means for monitoring said means for sensing the rotational speed of said haul-off rollers, and adjusting said drive signal to achieve a predetermined rotational speed of said haul-off rollers.

3. The apparatus of claim 2, wherein said means for storing a set point value for each of said angular segments further comprises means for measuring the relative average thickness variations over each of said angular segments.

4. The apparatus of claim 3, wherein said film thickness sensor further comprise a capacitance sensor.

5. A method of controlling the haul-off speed of film in a blown film machine having a rotating die and film bubble, to achieve a preselected thickness $T_s$, with a film thickness sensor positioned at a fixed position adjacent the film, comprising the steps of:
    a) subdividing the rotating film bubble into N angular segments, whereby the N angular segments rotate with the die;
    b) measuring film thickness T over a segment N and calculating an average T therefore;
    c) comparing the average T against $T_s$, and increasing the haul-off speed if $T > T_s$ and decreasing the haul-off speed if $T < T_s$.

6. The method of claim 5, wherein the haul-off speed is controlled by a variable speed motor and the step of increasing the haul-off speed further comprises increasing the voltage supplied to said variable speed motor if $T > T_s$, and the step of decreasing the haul-off speed further comprises decreasing the voltage supplied to said variable speed motor if $T < T_s$.

7. A method of controlling film thickness to a set point thickness $T_s$ in a blown film machine having a rotating die and rotating blown film bubble, and a variable speed motor connected to haul-off rollers for transporting the blown film away from the machine, comprising the steps of:
    a) subdividing the rotating film bubble into N angular segments, whereby the angular segments rotate with the die;
    b) measuring the blown film thickness at a point fixed in space and across each of the rotating N angular segments;
    c) calculating an average film thickness T for an angular segment N;
    d) increasing the speed of the variable speed motor if $T > T_s$; and
    e) decreasing the speed of the variable speed motor if $T < T_s$.

* * * * *